Patented Dec. 28, 1943

2,337,798

UNITED STATES PATENT OFFICE 2,337,798

MANUFACTURE OF NITROGEN SULPHIDE

Leroy R. Carl, Buffalo, N. Y.

No Drawing. Application January 11, 1941,
Serial No. 374,088

6 Claims. (Cl. 23—191)

This invention relates to a method of making sulphur nitride and is a continuation in part of my copending application, Serial No. 324,326, filed March 16, 1940.

In carrying out my invention I cause anhydrous ammonia to react with sulphur dichloride preferably in the absence of air and moisture, and protected from any source of intense light. The reaction is carried out in a closed vessel. The temperature is maintained below 80° C. and preferably below 40° C. but it is not essential that any particular pressure be maintained. The process of the present invention is an improvement in methods of producing sulphur nitride because of its simplicity and because of the good yields obtained.

I am aware of other known methods of producing sulphur nitride or nitrogen sulphide. It has been proposed to react dry ammonia with a solution of sulphur dichloride in benzene. It has also been proposed to pass dry ammonia into a solution of brown sulphur in carbon bisulphide.

The process of the present application has many advantages over such methods of producing sulphur nitride. The principal advantages are that of simplicity and economy. In practicing my process the two reacting materials alone may be used and it is not necessary to maintain any specific conditions except to maintain the two materials so that their vapors are in contact. In one form of the invention the reaction may be expedited by employment of a catalytic agent, such as finely divided iron or nickel. The catalyst need only be present in the mixture of the two vapors to cause the reaction to proceed more readily to completion.

The anhydrous ammonia and sulphur dichloride can be brought together in a closed vessel in any convenient way and caused to react. The ammonia in a gaseous condition may be delivered into a closed space containing the sulphur dichloride to cause the two materials to react. In a specific example of the process I employ a container formed of glass and having an air tight cover. Into this container I pour approximately 40 parts of sulphur chloride. Approximately 18 parts of anhydrous liquid ammonia is then placed in a separate open container and the open container placed within the glass container in such a way that the two liquids do not mix. The main container is then closed to prevent escape of the reacting materials and the products of the reaction. The fumes of the ammonia contact with the sulphur dichloride and react, the reaction starting at room temperature but as it proceeds the temperature increases to about 40° C. Under the specific conditions outlined, a pressure of as much as 10 pounds per square inch above atmospheric pressure may develop. The time required for the completion of the reaction under such conditions is approximately two hours. However, the reaction of the gaseous materials is almost instantaneous. The proportions of ammonia and sulphur dichloride used are approximately those required by the following equation:

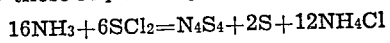

$$16NH_3 + 6SCl_2 = N_4S_4 + 2S + 12NH_4Cl$$

When a catalyst is employed it is placed in the container in such position that the vapors come in contact with it. It is preferably placed in the upper part of the container so that it does not become covered with the products of the reaction. Suitable catalysts which may be employed are finely divided iron, nickel or cobalt and as a specific example I may use finely divided pig iron. The catalyst may be mixed with a promoter and any of the compounds used in the synthesis of ammonia are suitable for this purpose. These promoters include the oxygen compounds of chromium, thorium, beryllium, antimony and aluminum and as a specific example I may employ aluminum oxide as the promoter.

As stated above, the reacting materials may be brought together in other ways for the production of sulphur nitride. The sulphur dichloride may be arranged in a closed container and the ammonia, in gaseous form, fed into the container, or the ammonia gas and the sulphur dichloride may be fed into the closed container simultaneously in approximately the proportions required to complete the reaction. The essential conditions are, only that the materials be brought together so that their vapors will be held in contact during the time required for reaction. The temperature should be held below 80° and preferably below 40° C. as a precaution against accident due to the dangerous nature of the product.

After the reaction is completed the resulting material is washed with an acid wash water to remove the ammonium chloride. The acidity of the wash water should be sufficient to change blue litmus to red. A stronger acid wash may be used. The material is then dried and extracted with a suitable solvent for crystallization.

I claim:

1. The process of producing sulphur nitride which comprises bringing vapors of anhydrous ammonia and sulphur dichloride into contact with each other in a closed space in the absence of the reacting materials in liquid form, and in the absence of water, air and intense light.

2. The process of producing sulphur nitride which comprises bringing vapors of anhydrous ammonia and sulphur dichloride into contact with each other in a closed space in the presence of a catalyst and in the absence of reacting materials in liquid form, and in the absence of water, air and intense light.

3. The process of producing sulphur nitride which comprises mixing vapors of anhydrous ammonia and sulphur dichloride in a closed vessel in the presence of a catalyst, and permitting the vapors to react with each other in the absence of the reacting materials in liquid form, and in the absence of water, air and intense light.

4. The process of producing sulphur nitride which comprises bringing vapors of anhydrous ammonia and sulphur dichloride into contact with each other in a closed space in the presence of finely divided iron and in the absence of the reacting materials in liquid form, and in the absence of water, air and intense light.

5. The process of producing sulphur nitride which comprises bringing vapors of anhydrous ammonia and sulphur dichloride in contact with each other in a closed space in the presence of a catalyst and a promoter and in the absence of the reacting materials in liquid form, and in the absence of water, air and intense light.

6. The process of producing sulphur nitride which comprises bringing vapors of anhydrous ammonia and sulphur dichloride in contact with each other in a closed space in the presence of finely divided iron and aluminum oxide and in the absence of the reacting materials in liquid form, and in the absence of water, air and intense light.

LEROY R. CARL.